United States Patent [19]
Sheldon

[11] 3,886,784
[45] June 3, 1975

[54] HIGH PRESSURE DEW AND FROST POINT INDICATOR

[75] Inventor: Robert S. Sheldon, Northridge, Calif.

[73] Assignee: Air-Dry Corp., Northridge, Calif.

[22] Filed: Mar. 15, 1973

[21] Appl. No.: 341,589

[52] U.S. Cl. ................................................ 73/17 A
[51] Int. Cl. ........................................... G01h 25/02
[58] Field of Search ...................... 73/17 A; 62/514

[56] References Cited
UNITED STATES PATENTS

| | | | |
|---|---|---|---|
| 2,376,209 | 5/1945 | Turin | 73/17 |
| 2,624,195 | 1/1953 | Van Alen | 73/17 |
| 2,680,371 | 6/1953 | Donath | 73/17 |
| 3,177,716 | 4/1965 | Warman | 73/17 |
| 3,195,345 | 7/1965 | Thiele | 73/17 |
| 3,314,473 | 4/1967 | Smith et al. | 62/514 |
| 3,374,658 | 3/1968 | Ford | 73/17 |
| 3,782,129 | 1/1974 | Petterson | 62/514 |

Primary Examiner—Herbert Goldstein
Attorney, Agent, or Firm—Robert C. Comstock

[57] ABSTRACT

A high pressure dew and frost point indicator for measuring the amount of water vapor in a gas stream. The device utilizes the gas sample at full input pressure and operates on power derived from the gas pressure without any external power source and with no moving parts. The sample stream is fed across the face of a mirror and then into a cryostat. In passing through the cryostat, the stream is expanded to atmospheric pressure and its temperature sharply reduced. The cold output gas from the cryostat is impinged against the back of the mirror to cool it. Clouding of the face of the mirror indicates the dew or frost point of the sample stream and a temperature sensing device indicates the temperature when the dew or frost point is reached. The cold output gas from the cryostat may also be used in a reverse direction surrounding the cryostat to cool the cryostat and sample stream and thereby provide lower temperature output.

5 Claims, 3 Drawing Figures

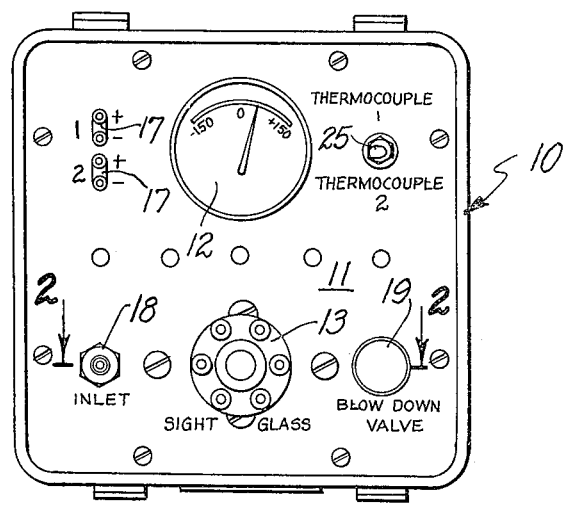
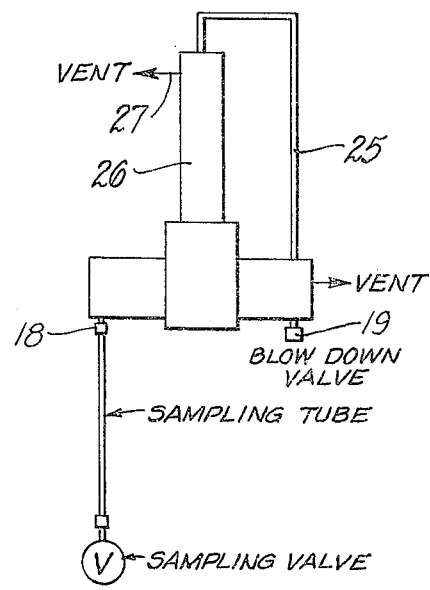
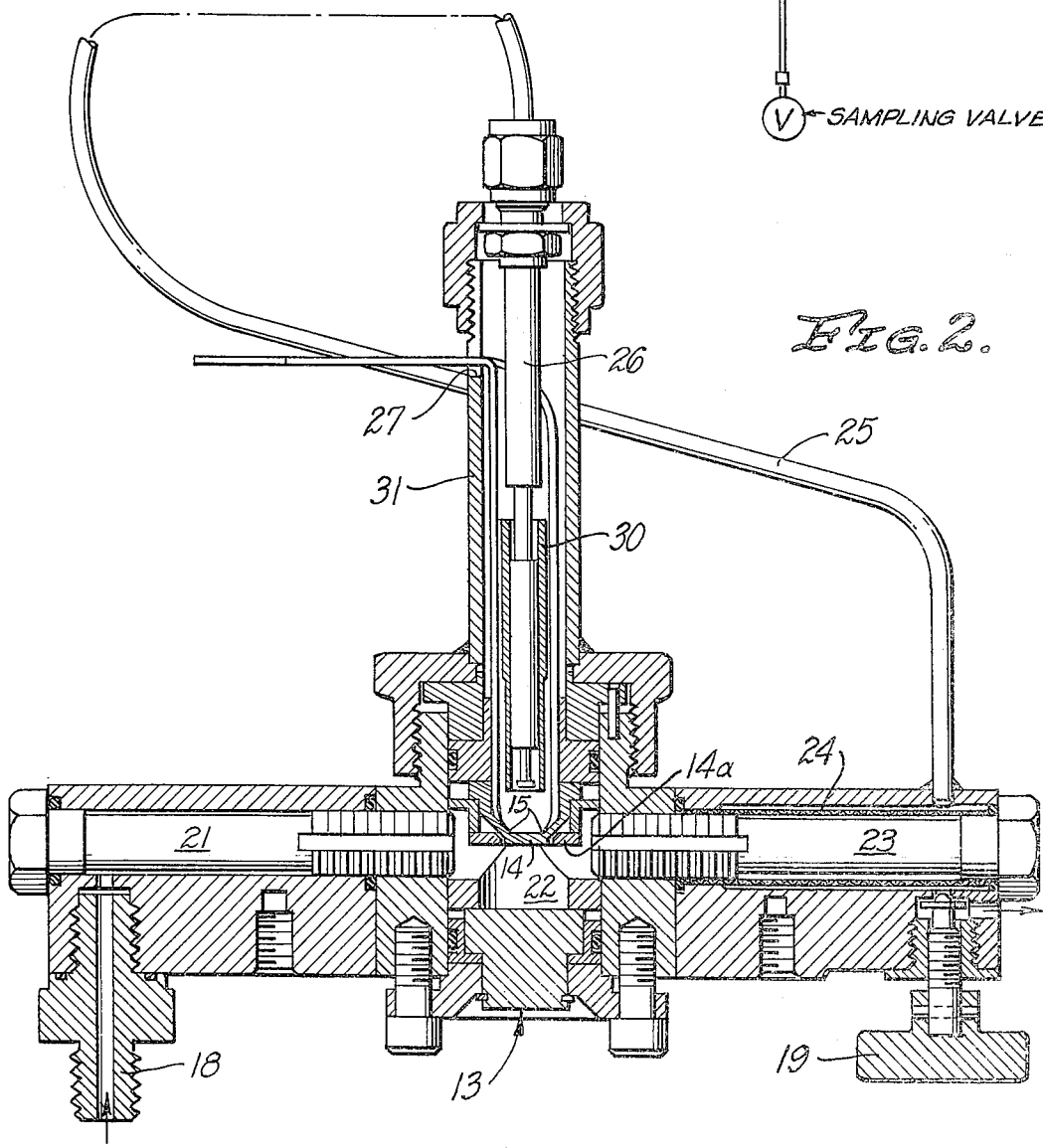

HIGH PRESSURE DEW AND FROST POINT INDICATOR

BACKGROUND OF THE INVENTION

1. Field of the Invention:

The invention relates to a dew and frost point indicator for determining the amount of moisture which is present in high pressure air and gas systems.

Navy ships employ high pressure air for numerous purposes, such as emergency blow down of ballast for submarines and for launching missiles. This pressurized air must be completely free from moisture, which would cause icing and plugging of control orifices, filters and block valves. High pressure air in Navy shipboard systems generally must be dry enough so that moisture will not appear as condensation as its temperature is lowered to at least $-60°$ F. at the usage pressure.

The device of the present invention has been designed to meet the requirements for an accurate and reliable moisture test indicator. It is extremely responsive and reliable and cools to temperatures as low as $-100°$ F. and is sufficiently rugged to be used as a portable instrument.

2. Description of the Prior Art:

Dew and frost point indicators which are now in use for measuring the mixture of the content of gas streams customarily require reduction of the sample stream to atmospheric pressure. This requires means for accomplishing such pressure reduction and it also makes it necessary to use conversion tables in order to convert the reading to make it applicable to the pressure involved prior to reduction.

The devices now in use also customarily require external power sources and/or an external source of refrigeration. Some are relatively complex and expensive electronic instruments which require skilled personnel to operate them and which require extensive maintenance.

SUMMARY of the INVENTION

The invention provides a completely self-contained high pressure moisture measuring device which requires no external source of power other than the high pressure stream of air or gas being tested. Air or gas at ambient temperatures which is to be measured for moisture content is brought to the instrument and goes to a sample chamber where it passes over a highly polished metal surface mirror. When precipitation occurs on the surface of the mirror, it can be observed from a lens. The air at full pressure flows slowly across the polished metal surface to a cryostat. The cryostat is a device containing high pressure thin tubing wound tightly around a central mandrel and terminating in an open tip. Air passes through this cryostat and expands rapidly to atmosphere in what is known as a Joule-Thompson expansion process, which results in a low temperature stream.

The dew or frost point temperature is read directly from the indicator at the time precipitation is first observed on the face of the mirror. This reading indicates the amount of moisture which is present in the sample stream.

The cold air or gas stream from the cryostat may subsequently be used to pre-cool the incoming sample stream, thereby making lower temperatures achievable.

A blow-down valve is provided to clear the device for immediate repeat readings.

The simplicity of the structure and operation of the present invention make is possible for the device to be manufactured and operated at lower cost, with less skilled personnel and with accurate results which are read directly from the instrument.

It is accordingly among the objects of the invention to provide a dew or frost point indicator having all of the advantages and benefits of the structure set forth above and described in detail hereinafter in this specification.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is an elevational view of the front panel of the case, with the cover removed;

FIG. 2 is a sectional view of the indicator taken on line 2—2 of FIG. 1;

FIG. 3 is a schematic flow diagram.

DESCRIPTION OF THE PREFERRED EMBODIMENT

The device is enclosed within a case 10 having a front control panel 11, which is shown in FIG. 1 of the drawings. In the top center of the control panel 11 is an indicator dial 12 which covers temperatures from minus 150° F. to plus 150° F. Through a viewing port and lens 13 the face of a mirror 14 disposed within the case 10 can be seen to determine visually when the dew or frost point is reached as indicated by the formation of precipitation on the face of the mirror.

The temperature at which the precipitation first forms is measured and indicated by either of a pair of thermocouples 15 which are attached to the back of the mirror 14 and connected to the dial 12. Two thermocouples are provided as a safety feature in case one thermocouple or its circuit should malfunction. The selection of which thermocouple is used is controlled by a manually operated switch 25 disposed in the upper right hand corner of the panel 11.

In the upper left hand corner of the panel 11 are four electrical outlet jacks 17 which may be used to connect the electrical signals from the thermocouples 15 to a recorder for recording the temperatures measured by the thermocouples.

Instead of thermocouples, the indicator may be provided with thermistors or other suitable temperature sensing devices, including a digital temperature readout. Such devices may require electrical power for their operation, but the remainder of the indicator would still function entirely on power derived from the pressure of the sample stream.

In the lower left hand corner of the panel 11 is a sample gas inlet 18. In the lower right hand corner is a blow-down valve 19 which is used to clear the face of the mirror 14 for repeat readings.

Referring to FIG. 2 of the drawings, the sample gas inlet fitting 18 is disposed at the lower left hand corner of the drawing. The indicator may be connected to a pressure air systems having pressure between 3,000 and 5,000 PSIG. A conventional type sample stream connector tube may be used to connect the indicator to the pressure source.

The high pressure sample stream goes through a passage in the fitting 18 and passes around a bolt 21. The threaded end of the bolt 21 is provided with a milled slot 21a through which the gas or air flows.

The sample stream then flows at full pressure into and across a sample chamber 22 which is disposed directly in front of the face of the mirror 14. The mirror 14 is preferably formed of metal having a highly polished face.

From the sample chamber 22, the sample stream flows through a slot 23a in the end of a second bolt 23 on the right side of FIG. 2 and then around the bolt 23 and out through a stainless steel woven wire filter 24 into a looped tube 25. The opposite end of the tube 25 is connected to the inlet of a cryostat 26. The cryostat contains high pressure thin tubing which is helically wound tightly around a central mandrel and terminates in an open tip. Air or gas passes through the cryostat and expands rapidly to atmospheric pressure in what is known as the Joule-Thompson expansion process.

The cryostat causes a severe drop in temperature of the flowing air. The high pressure air at 3,000 to 5,000 PSIG is expanded rapidly to substantially atmospheric pressure and its temperature lowered to as low as −100° F, depending on the efficiency of the insulating media surrounding the cryostat itself. Use of a Kel-F sleeve in this instrument assures a temperature of at least −150° F. with inlet air at 3,000 PSIG. With an evacuated Dewar flask surrounding the cryostat, this same instrument has produced temperatures equivalent to that of liquid air in less than 1½ minutes.

The outlet end of the cryostat 26, which is shown as the lower end in FIG. 2, is directed against the back of the mirror 14. The highly turbulent cold air or other gas output from the cryostat 26 removes sufficient heat from the heat transfer surface behind the mirror 14 to cause a substantial lowering of its surface temperature to at least −60° f. With air at 3,000 PSIG, it requires less than 4 minutes to cool the polished metal surface from room temperature to below −60° F. At higher pressures, the instrument can cool its mirror surface to as low as −100° F. in relatively shorter periods of time.

The temperature gauge 12 mounted on the panel 11 displays the temperature of the mirror surface as the dew or frost point of the sample stream is reached as determined by visual observation through the viewing port and lens 13 of the first formation of frost or moisture on the face of the mirror 14. The temperature indicator 12 is connected to the thermocouples 15 which are embedded just behind the mirrored surface. Two Cooper Constantan thermocouples are installed and either one may be used to display the frost point.

The cold, low-pressure air or gas from the cryostat 26, after having absorbed some heat from the mirror cooling section, then passes counter-flow in the reverse direction (upwardly in FIG. 2) around the thin tubing of the cryostat 26 in a helical flow path. The outside of the cryostat 26 actually comprises a plurality of closely spaced helical fins which are not shown in the drawings because of the difficulty of illustration and because they are well known to those skilled in the art. The cryostat 26 is mounted within a tightly fitting Kel-F tetrafluoroethylene mounting jacket 30 and the return air moves upwardly within the jacket 30 along the helical path defined by the fins of the cryostat 26 as it would move along the threads of a screw.

The cryostat 26, jacket 30 and the wiring for the thermocouples 15 are all enclosed within a tubular casing 31, which is provided with an outlet 27 through which the wires extend and which also acts as a vent for the return air.

The return cold air or gas which passes around the outside of the cryostat absorbs heat from the incoming high pressure sample air within the cryostat 26, thus increasing the efficiency of the Joule-Thompson expansion and lowering the temperature of the expanding gases. The low pressure exhaust air or gas is finally vented to the atmosphere through the outlet 27 at a temperature within a few degrees of ambient.

If the operator wishes to obtain more moisture measurements, he simply opens the blow-down valve 19, thus venting the sample air from the sample chamber 22 in front of the mirror 14 out through the blow-down valve outlet shown in the lower right hand corner of FIG. 2. This operation simultaneously diverts all air flow from the cryostat 26 and stops its refrigerating effect. When the face of the mirror 14 is cleared and the temperature indicator dial 12 has risen to approximately ambient temperature, the operator may then close the blow-down valve 19 and the frost point indicator is immediately ready for a rapid reading. Blow-down after each temperature measurement also acts to clear the instrument of any precipitated moisture.

The only control device on the indicator is the blow-down valve 19. It is used to defrost the mirror 14 quickly so that a rapid measurement may be made. It also removes condensed water from the instrument after it has been connected to a wet air line. It may also be used to control the temperature of the mirror 14, especially at high pressures where the pull-down time is short and the temperature drop may be too rapid.

The mirror 14 preferably consists of two concentric mirrors, both highly polished but thermally insulated from each other. The central mirror disc 14 is cooled to frost point temperatures, while an outer disc 14a remains at substantially ambient temperatures. This affords a sharp contrast at the frost point for confirmation of the observed frost point reading.

As shown in FIG. 2 of the drawings, the sample chamber 22 is closed off from the cryostat 30, so that sample chamber 22 is not cooled by the cryostat 30 (except for the cooling of the back of the mirror 14). The sample gas stream passing into the inlet 18 is not cooled by the cryostat 30 )or otherwise) prior to its entry into the sample chamber 22. While the sample stream after it has passed through sample chamber 22 is for purposes of convenience used as a source of supply for the cryostat 30, it will be obvious that any other source of gas or air supply may be used instead without in any way affecting the operation of the device.

I claim:

1. A dew and frost point indicator for measuring the amount of water vapor in a sample gas stream, said indicator including cryostat means of the Joule-Thompson expansion process type, means for passing gas through said cryostat to expand said gas to atmospheric pressure to provide cold outlet gas from said tip, a mirror disposed in front of said tip, the flow of said cold gas being directed against the back of said mirror to chill said mirror, a sample chamber disposed in front of said mirror, said sample chamber being closed off from said cryostat, means for passing a sample gas stream through said sample chamber at ambient temperature, whereby frost is formed only on the front of said chilled mirror by condensation from the sample stream, means for optically observing the initital formation of frost on the front of said mirror, means for measuring the temperature of said mirror at the time of said initial formation of frost, said cryostat means including thin helically wound high pressure tubing, said tubing having cooling fins, means for directing the output of said tip over said cooling fins for additional cooling, said tubing mounted within a tightly fit jacket, said cooling fins defining a helical path within said jacket and around said tubing, means for directing the cold output from said tip along said helical path to cool said fins and tubing, and means for supplying gas from said sample stream to said cryostat to operate said cryostat, said mirror comprising two adjacent concentric mirrors thermally insulated from each other, one of said mirrors being cooled by said cryostat and the other of said mirrors remaining at substantially ambient temperature.

2. The structure described in claim 1, said mirrors comprising a central circular mirror and an outer mirror concentric therewith, said central mirror being cooled by said cryostat.

3. The structure described in claim 2, and a pair of thermocouples attached to the back of said central mirror, said thermocouples being connected to a dial for direct reading and to outlet jacks for recording.

4. The structure described in claim 2, and a blowdown valve operable to vent sample air from the sample chamber and clear the face of said central mirror.

5. The structure described in claim 1, and means for supplying to said cryostat gas from said sample stream which has exited from said sample chamber.

* * * * *